US006344699B1

(12) United States Patent
Rimmer

(10) Patent No.: US 6,344,699 B1
(45) Date of Patent: Feb. 5, 2002

(54) A.C. CURRENT DISTRIBUTION SYSTEM

(75) Inventor: Philip John Rimmer, Chingford (GB)

(73) Assignee: Tunewell Technology, LTD, London (GB)

(*) Notice: Subject to any disclaimer, the term of this patent is extended or adjusted under 35 U.S.C. 154(b) by 0 days.

(21) Appl. No.: 09/355,428

(22) PCT Filed: Jan. 27, 1998

(86) PCT No.: PCT/GB98/00239

§ 371 Date: Sep. 20, 1999

§ 102(e) Date: Sep. 20, 1999

(87) PCT Pub. No.: WO98/33256

PCT Pub. Date: Jul. 30, 1998

(30) Foreign Application Priority Data

Jan. 28, 1997 (GB) ............................................ 9701687

(51) Int. Cl.[7] .................................................. H02J 3/10
(52) U.S. Cl. .......................................... 307/42; 307/36
(58) Field of Search ..................................... 307/36, 42

(56) References Cited

U.S. PATENT DOCUMENTS 390,990 A * 9/1888 Shallenberger .............. 307/36
3,783,374 A 1/1974 Eide et al. .................... 324/60
4,772,806 A * 9/1988 Lean et al. ................... 307/36
4,912,372 A * 3/1990 Mongoven ................... 307/36
5,465,010 A 11/1995 Rimmer ...................... 307/9.1
5,886,423 A * 3/1999 Gershen et al. ............... 307/36

FOREIGN PATENT DOCUMENTS

EP 0 587 923 3/1994
EP 0 597 661 5/1994

* cited by examiner

*Primary Examiner*—Fritz Fleming
(74) *Attorney, Agent, or Firm*—Amstrong, Westerman, Hattori, McLeland & Naughton, LLP

(57) ABSTRACT

An a.c. current distribution system fed by a current source for providing electrical power to a load, the current distribution system comprising a first and second conductive means connectable to the current source and coupling means to couple substantially one half of the load in series at a first position along the first conductive means and to couple substantially the other half of the load in series at a second position along the second conductive means, the first and second positions being substantially the same distance along the first and second conductive means from the current source.

15 Claims, 4 Drawing Sheets

A.C. CURRENT DISTRIBUTION SYSTEM

FIELD OF THE INVENTION

THIS INVENTION relates to improvements in or relating to an a.c. current distribution system and more particularly relates to an a.c. current distribution system for minimising the electric field along the current distribution system.

BACKGROUND OF THE INVENTION

A typical a.c. voltage distribution system is shown in FIG. 1 of the accompanying drawings. The a.c. voltage distribution system comprises first and second voltage generators which generate, respectively, a.c. voltages $V_A$ and $V_B$, $V_A$ being equal to and 180° out of phase with $V_B$ such that $V_A=V_B$. The two voltages are fed down a power bus comprising a pair of conductive tracks which run parallel to one another and are separated from one another. As seen in FIG. 1, various impedance loads may be connected to the tracks along the length of the tracks. Such a voltage distribution system is characterised by the sum of the currents in the adjacent tracks at any one instant in a specific locality along the tracks being zero thereby resulting in a low magnetic field (H-field). Similarly, the sum of the voltages in the adjacent tracks at any instant in a specific locality along the tracks are also zero. This results in a low electric field (E-field).

In some applications, it is preferable to use an a.c. current distribution system rather than an a.c. voltage distribution system such as a current loop system. An example of such a current distribution system is shown in FIG. 2 of the accompanying drawings.

A typical a.c. current distribution system Comprises two a.c. current generators which generate, respectively, currents I and $\bar{I}$ at voltages $V_1$ and $V_2$, where $V_2=V_1$. The current generators are regulated to be constant and precisely antiphase with one another, although the amplitude of the current need not be precisely regulated. The currents are fed to a current loop comprising a pair of conductive tracks which run parallel to one another and are separated from one another. Any impedance loads to be powered from the current loop system are connected in series to one or other of the tracks. At any instant, the sum of the currents in a specific locality along the lengths of the tracks is zero. This results in a low magnetic field. However, in contrast to the a.c. voltage distribution system, the sum of the voltages at any instant along the tracks in a specific locality is not zero and, in fact, increases along the length of the tracks depending upon the number of loads connected in series along the tracks. This results in a worsening electric field along the length of the tracks. For example, in the locality immediately between the current generators and a first load, the sum of the voltages is zero at any one instant. In the locality immediately after the first load and before the second load, the sum of the voltages is: $\Sigma V=V_1+V_1-V_{Load}$. Further, at the tip of the loop, the sum of the voltages, $\Sigma V$, equals $2V_1$. The increase in the sum of the voltages, $\Sigma V$, from 0 to $2V_1$ results in a worsening electric field along the length of the track.

OBJECT OF THE INVENTION

It is an object of the present invention to provide an a.c. current distribution system which does not suffer from the above-mentioned disadvantages.

SUMMARY OF THE INVENTION

Accordingly, one aspect of the present invention provides an a.c. current distribution system fed by a current source for providing electrical power to a load, the current distribution system comprising a first and a second conductive means which run parallel to one another, which are connectable, respectively, at one end to the current source and which are connected together at the other end to form a current loop, and coupling means to couple substantially one half of the load in series at a first position along the first conductive means and to couple substantially the other half of the load in series at a second position along the second conductive means, the first and second positions being substantially adjacent one another.

Another aspect of the present invention provides a method of reducing the electric field in a current distribution system comprising the steps of coupling a load to be powered by a current source feeding the current distribution system to a first and second conductive means which run parallel to one another, which are connectable, respectively, at one end to the current source and which are connected together at the other end to form a current loop, wherein substantially one half of the load is coupled in series at a first position along the first conductive means and substantially the other half of the load is coupled in series at a second position along the second conductive means, the first and second positions being substantially adjacent one another such that the sum of the voltages on the conductive means in the same locality at any one instant is zero.

Conveniently, the load comprises two distinct half loads, each of which is ohmically connected in series to the respective conductive means.

Preferably, the load is inductively coupled to the respective conductive means by a transformer.

Advantageously, the load is ohmically connected across the terminals of one or more secondary windings of the transformer and the coupling means comprises a pair of substantially identical primary windings of the transformer, each of which is ohmically connected in series to the respective conductive means, the voltage drops across the primary windings being substantially identical, such that the load is split substantially equally between the two primary windings.

In order that the present invention may be more readily understood, embodiments thereof will now be described, by way of example, with reference to the accompanying drawings, in which:

DETAILED DESCRIPTION OF THE INVENTION

Figure 1:
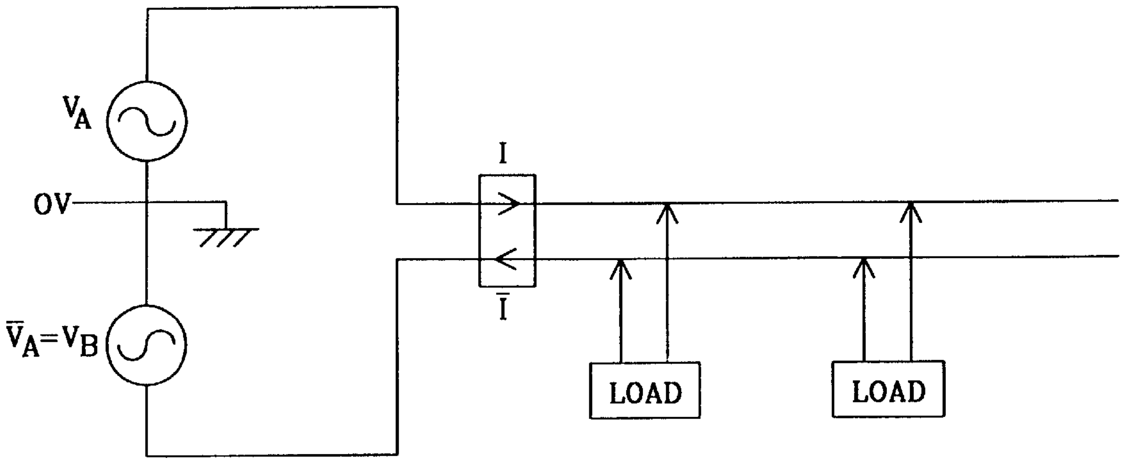
FIG. 1 PRIOR ART
FIG. 1 is a schematic representation of a known a.c. voltage distribution system.
Figure 2:
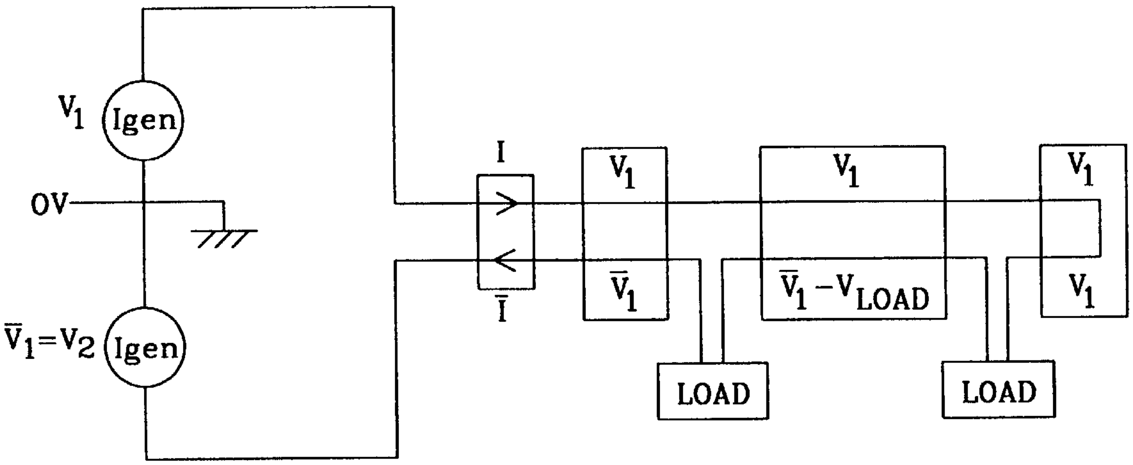
FIG. 2 PRIOR ART
FIG. 2 is a schematic representation of a known a.c. current distribution system.

Referring to FIG. 2, the problem associated with known a.c. current distribution systems is that the electric field worsens as loads are connected in series along the length of the track. As previously mentioned, referring to FIG. 2, a typical a.c. current distribution system comprises two a.c. current generators which generate, respectively, currents I and $\bar{I}$ at voltages $V_1$ and $V_2$, where $V_2=V_1$. The currents are fed to a current loop comprising a pair of conductive tracks which run parallel to one another and are preferably separated from one another.

Any impedance loads to be powered from the current loop system are connected in series to one or other of the tracks. At any instant, the sum of the currents in a specific locality along the lengths of the tracks is zero. This results in a low magnetic field. However, in contrast to the voltage distribution system, the sum of the voltages at any instant along the tracks in a specific locality is not zero and, in fact, increases along the length of the tracks depending upon the number of loads connected in series along the tracks. This results in a worsening electric field along the length of the tracks. For example, in the locality immediately between the current generators and a first load, the sum of the voltages is zero at any one instant. In the locality immediately after the first load and before the second load, the sum of the voltages is: $\Sigma V=V_1+V_1-V_{Load}$. Further, at the tip of the loop, the sum of the voltages, $\Sigma V$, equals $2V_1$. The increase in the sum of the voltages, $\Sigma V$, from 0 to $2V_1$ results in a worsening electric field along the length of the track.

Figure 3:
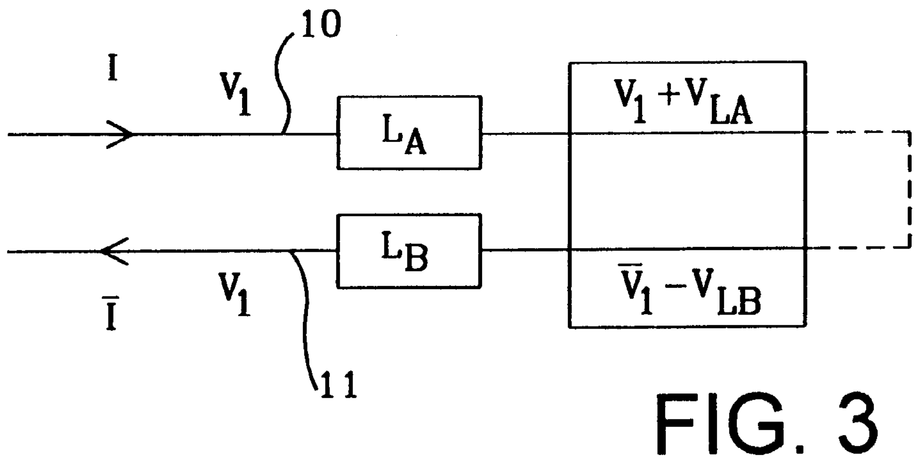
FIG. 3 is a schematic representation of a first embodiment of an a.c. current distribution system according to the present invention.

Referring to FIG. 3, an a.c. current distribution system embodying the present invention incorporates a conventional current source as previously described in relation to the current distribution system shown in FIG. 2. The current source feeds the current loop comprising two conductive tracks 10,11.

An impedance load $L_T$ is to be powered from the current loop. The load $L_T$ is split into two equal half loads $L_A$, $L_B$, which are connected in series to respective tracks 10,11 substantially adjacent one another in the same locality—i.e. distance along the tracks from the current source. Thus, half the load $L_A$ is connected in series with the first track 10 and halt the load $L_B$ is connected in series with the second track 11. The voltage on track 10 immediately before the first half load $L_A$ is $V_1$ and the voltage immediately after the first half load $L_A$ is $V_1-V_{LA}$. Similarly, the voltage on track 11 immediately before the second half load $L_B$ is $V_1$ and the voltage immediately after the second half load $L_B$ on track 11 is $V_1-V_{LB}$. By locating half the load $L_T$ on each of the tracks 10,11, the sum of the voltages immediately preceding the half loads $L_A$, $L_B$ on tracks 10 and 11 is zero $(V_1+V_1)$ and the sum of the voltages on the tracks 10,11 immediately after the half loads $L_A$, $L_B$ is also zero $(V_1+V_{LA})+(V_1-V_{LB})$, where $L_A=L_B$ and $V_{LA}=V_{LB}$. In this manner, not only are any voltage drops across the impedance load $L_T$ matched, but also any phase changes. Thus, should the impedance load incorporate a reactive component, these too will sum to zero.

In contrast to the conventional a.c. current distribution system, the current distribution system embodying the present invention maintains a substantially zero electric field not only along the tracks 10,11 before any impedance loads but also after any loads since the impedance loads are split evenly at substantially the same localities along the tracks 10,11 around the current loop.

An example of a load $L_T$ which can be split into equal parts as described above would be a double incandescent stop lamp comprising two separate 5 ohm bulbs. The first bulb could comprise the first half load $L_A$ on the first track 10 and the second bulb of the pair could comprise the second half load $L_B$ on the track 11. Alternatively, if only a single 10 Ohm incandescent bulb is to be used as part of a cluster, two separate 5 Ohm bulbs could be connected to respective tracks 10,11 rather than using a single bulb. In this manner; the load is evenly split in the same locality between the tracks and the electric field along the tracks is thus maintained at substantially zero.

Figure 4:
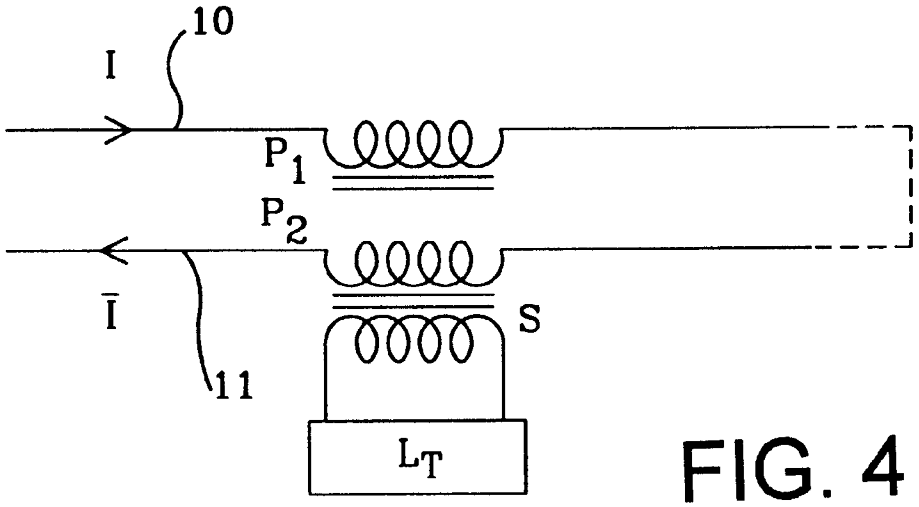
FIG. 4 is a second embodiment of an a.c. current distribution system according to the present invention.

Of course, there are some loads which are either impossible or impractical to split. In such circumstances, the same concept as described above is implemented but the load is inductively coupled to the tracks 10,11 of the current loop using a transformer. Such an arrangement is shown schematically in FIG. 4. The unsplitable load $L_T$ is connected to the terminals of a secondary winding S of a transformer. The transformer has a pair of primary windings $P_1$, $P_2$. One of the primary windings $P_1$ is connected in series with the track 10 and the other primary winding $P_2$ is connected in series the same locality along the lengths of the tracks 10,11 to track 11. The primary windings are adjacent one another and are inductively coupled to the secondary winding S and thence to the load $L_T$. $P_1$ and $P_2$ are substantially identical primary windings which cause identical voltage drops either side thereof such that the sum of the voltages at any locality along the track 10,11 within the distribution system at any one instant is zero. Accordingly, the electric field is maintained at substantially zero.

Transformers which are used for other purposes such as isolation, voltage/current matching to a load or, indeed, control purposes can be easily integrated for use in an a.c. current distribution system embodying the present invention.

Embodiments of the present invention are particularly well suited to operation at frequencies of the 20 kHz or greater range.

Preferably, the primary windings $P_1$ and $P_2$ have an identical number of turns and are perfectly matched and result in a 1:1 ratio with perfect coupling. However, in some circumstances, the coupling between the primary windings is not perfect and can, therefore, lead to slight discrepancies between the voltages present immediately before the primary windings on the tracks 10,11 and those present immediately after the primary windings. A similar problem can arise if the load described in FIG. 3 is not split exactly equally when connected in series on tracks 10 and 11.

In circumstances where the load has not been split equally or when the primary windings do not exhibit perfect coupling, it is possible to remedy the situation by connecting a balancing auxiliary transformer $T_x$ across the tracks 10,11. The auxiliary balancing transformer could be a tightly coupled bifilar wound toroid. The centre of the transformer coil is centre-tapped to zero volts. This arrangement serves to balance the voltages at the point of connection of the balancing transformer $T_x$ to the tracks 10,11 to be exactly opposite one another such that the sum of these voltages at the locality at any instant will be zero. Little power is transferred between the primary windings $P_1$ and $P_2$ so any current in the balancing transformers would be low.

Figure 6:
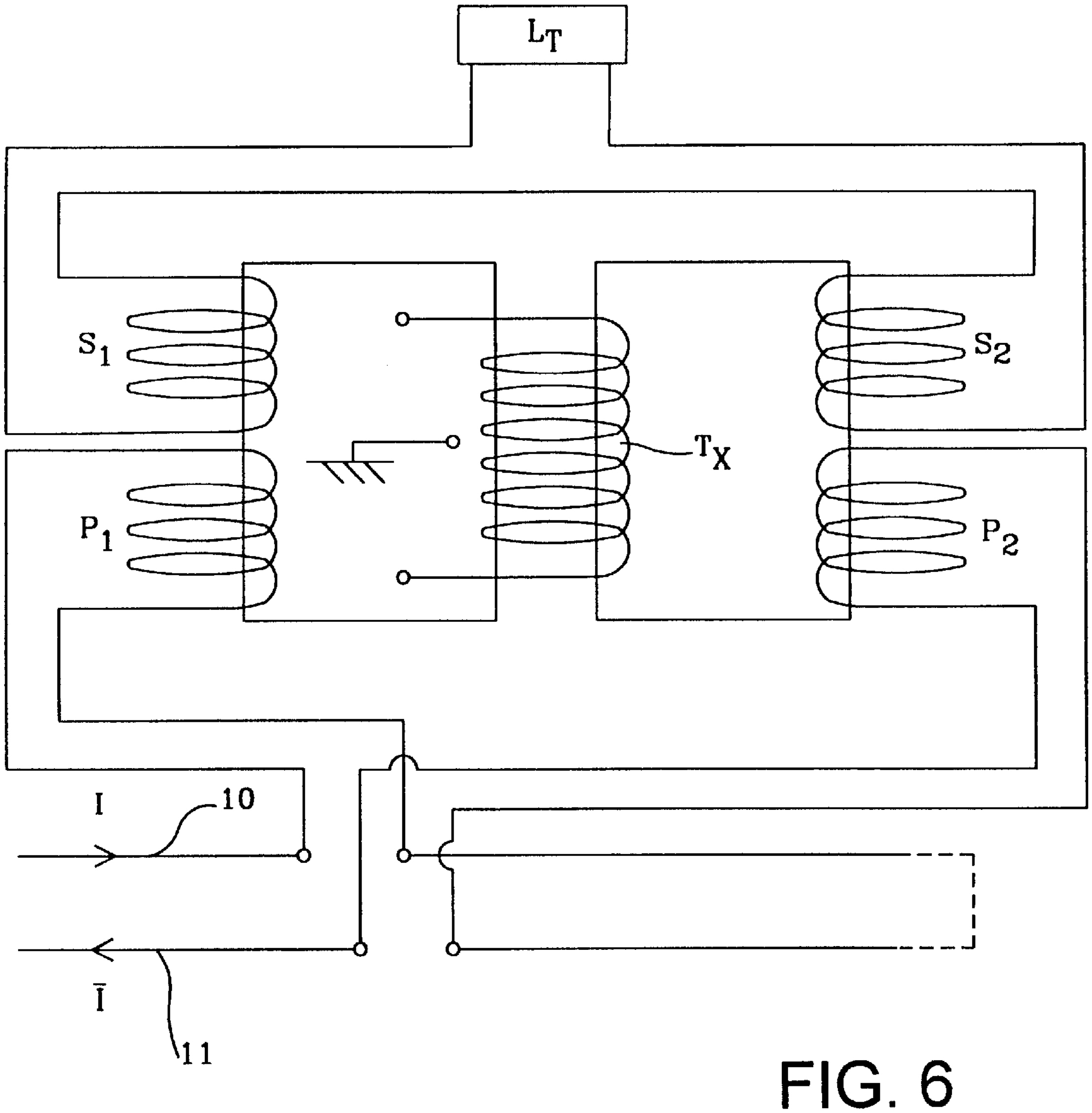
FIG. 6 is a schematic representation of the embodiment of FIG. 2 incorporating a balancing transformer.

Referring to FIG. 6, the existing primary and secondary windings $P_1$, $P_2$, $S_1$, $S_2$ of an E-type core transformer connected to a load $L_T$ can be easily incorporated into an a.c. current distribution system according to the present invention by simply connecting the terminals of the first primary winding $P_1$ in series to track 10 and the terminals of the secondary primary winding $P_2$ in series to the track 11 at substantially the same locality along the tracks 10,11.

Figure 5:
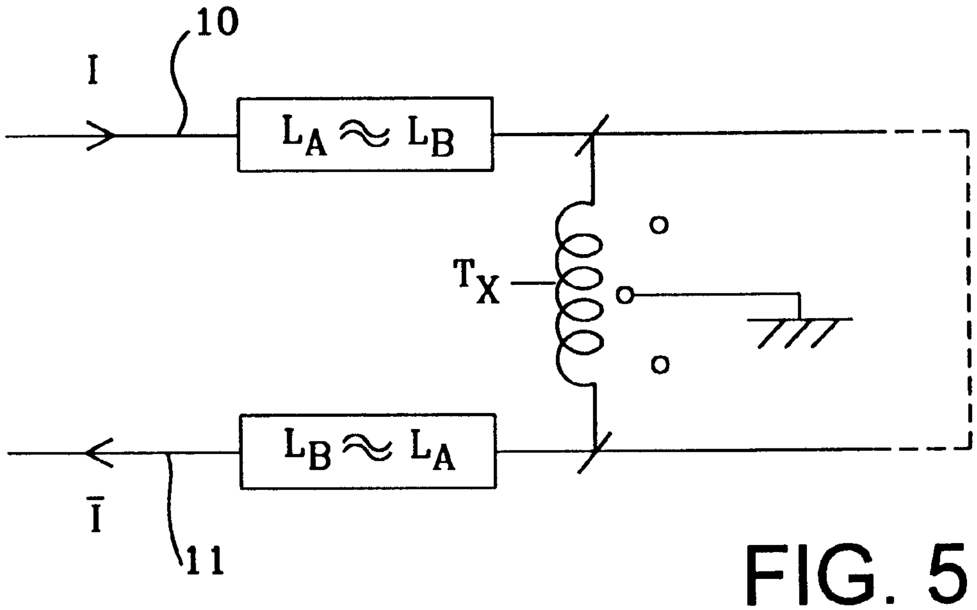
FIG. 5 is a further embodiment of an a.c. current distribution system according to the present invention incorporating a balancing transformer.

The auxiliary balancing transformer $T_x$, previously discussed in relation to FIG. 5, can be implemented as shown in FIG. 6. The balancing transformer $T_x$ has been wound around the central core of the E-type core. Respective pairs of primary and secondary windings $P_1$, $P_2$, $S_1$, $S_2$ are wound in conventional positions on the other arms of the transformer.

Figure 7:
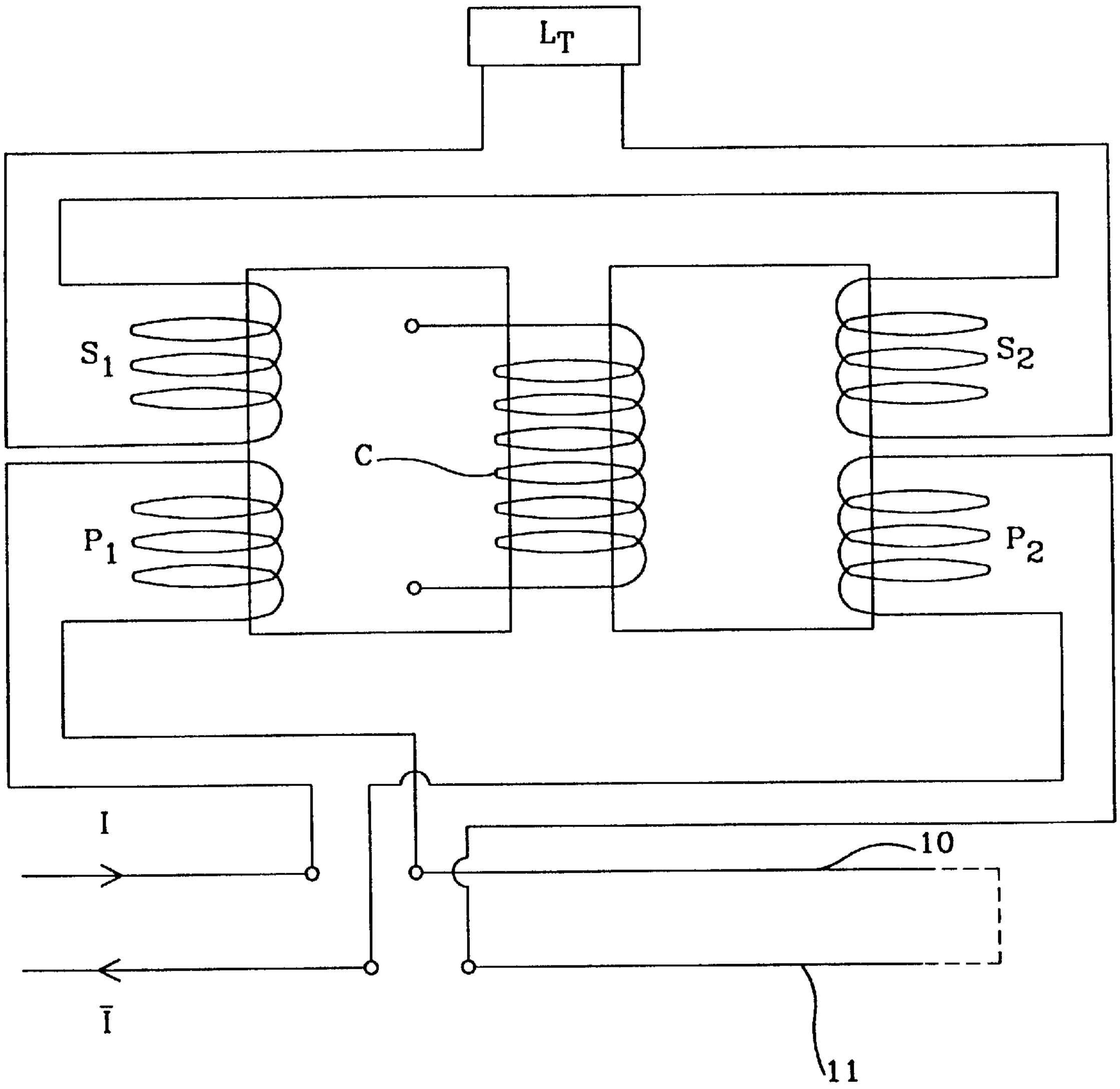
FIG. 7 is a schematic representation of the embodiment of FIG. 2 provided with a control coil.

As previously mentioned, existing transformers used for other purposes, such as control purposes, are easily implemented in an a.c. current distribution system embodying the present invention. In one such embodiment, shown in FIG. 7, the central core of the transformer shown in FIG. 6 can be wound with a control winding C to replace the balancing transformer $T_x$. The primary windings $P_1$, $P_2$ are split as previously described in relation to FIG. 4 and connected respectively in series to the tracks 10,11 such that any voltage drop or phase shift across one primary winding is matched by one identical voltage drop or phase shift in the other primary winding. For example, for power lines or the like. When energised, the control winding saturates the core thereby limiting the voltage generated across the secondary windings $S_1$, $S_2$ and provided to the inductance load $L_T$. If the current to the control winding C around the saturable core is terminated, then the core becomes substantially unsaturated enabling the normal output voltage on the secondary windings $S_1$, $S_2$ to power the load $L_T$. Such an arrangement allows ready control and switching of the load by appropriately altering the current supplied to the control winding C, whilst maintaining an equal voltage drop across the primary windings connected in series to the respective tracks 10,11. In one embodiment the tracks 10,11 are made from copper and run parallel to one another and are spaced apart by a small distance in the order of 10ths of millimetres. These tracks 10,11 are separated by an insulating plastics layer 12 such as a polyester, polypropylene or polyphenylene sulphide. The thickness of the insulating layer 12 is in the order of 0.1 mm.

Whilst previously described embodiments are on a small scale, it is envisaged that the same concept can be easily implemented on a larger scale.

What is claimed is:

1. An a.c. current distribution system fed by a current source for providing electrical power to a load, the current distribution system comprising a first and a second conductive means which run parallel to one another and are spaced apart a small distance from one another, which are connectable, respectively, at one end to the current source and which are connected together at the other end to form a current loop, and coupling means to couple substantially one half of the load in series at a first position along the first conductive means and to couple the remaining half of the load in series at a second position along the second conductive means, the first and second positions being substantially the same distance along the first and second conductive means from the current source.

2. A system according to claim 1, wherein the load comprises two distinct half loads, each of which is ohmically connected in series to the respective conductive means.

3. A system according to claim 1, wherein the load is inductively coupled to the respective conductive means by a transformer.

4. A system according to claim 3, wherein the load is ohmically connected across the terminals of one or more secondary windings of the transformer and the coupling means comprises a pair of substantially identical primary windings of the transformer, each of which is ohmically connected in series to the respective conductive means, the voltage drops across the primary windings being substantially identical, such that the load is split substantially equally between the two primary windings.

5. A system according to claim 3 or 4, wherein the transformer has an E-type core, the central core thereof being wound with a control coil operable to saturate the core to limit the voltage generated across the or each secondary winding.

6. A system according to claim 1, wherein a balancing transformer centre-tapped to zero volts is connected across the first and second conductive means to balance voltages on the conductive means at either end of the balancing transformer to be substantially opposite one another such that the sum of these voltages at any instant is zero.

7. A system according to claim 6, wherein the balancing transformer is a tightly coupled bifilar wound toroid.

8. A system according to claim 6 or 7, wherein a balancing transformer is incorporated in the current distribution system for balancing the voltage drops across the means for coupling substantially one half of the load to the first conductive means and the remaining half of the load to the second conductive means if the voltage drops across the means for coupling substantially one half of the load to the first conductive means and the remaining half of the load to the second conductive means are not substantially identical.

9. A system according to claim 1, wherein the conductive means comprises a pair of conductive tracks.

10. A system according to claim 9, wherein the tracks are made from copper.

11. A system according to claim 9 or 10, wherein the tracks run parallel to one another and are separated by an insulating material.

12. A system according to claim 11, wherein the insulating material is a plastics material such as polyester, polypropylene or polyphenylene sulphide.

13. A system according to claim 1, wherein the frequency of operation is in the region of 20 kHz or greater.

14. A method of reducing the electric field in a current distribution system comprising the steps of coupling a load to be powered by a current source feeding the current distribution system to a first and second conductive means which run parallel to one another and are spaced apart a small distance from one another, which are connectable, respectively, at one end to the current source and which are connected together at the other end to form a current loop, wherein substantially one half of the load is coupled in series at a first position along the first conductive means and the remaining half of the load is coupled in series at a second position along the second conductive means, the first and second positions being substantially the same distance along the first and second conductive means from the current source, such that the sum of the voltages on the conductive means, at the same distance along the first and second conductive means from the current source, at any one instant is zero.

15. A method according to claim 14, wherein the load comprises two distinct half loads which are ohmically connected in series to the respective conductive means.

* * * * *